(12) United States Patent
Fukuda et al.

(10) Patent No.: US 10,255,611 B2
(45) Date of Patent: Apr. 9, 2019

(54) DETERMINING PRICING USING CATEGORIZED COSTS WITH TREE STRUCTURES

(71) Applicant: INTERNATIONAL BUSINESS MACHINES CORPORATION, Armonk, NY (US)

(72) Inventors: Mari A. Fukuda, Tokyo (JP); Takayuki Kushida, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 525 days.

(21) Appl. No.: 14/946,924

(22) Filed: Nov. 20, 2015

(65) Prior Publication Data

US 2017/0148044 A1    May 25, 2017

(51) Int. Cl.
  *G06Q 30/02*    (2012.01)
(52) U.S. Cl.
  CPC .................................. *G06Q 30/0206* (2013.01)
(58) Field of Classification Search
  CPC ............... G06Q 10/101; G06Q 10/103; G06Q 30/0201; G06Q 30/0206
  See application file for complete search history.

(56) References Cited

U.S. PATENT DOCUMENTS 7,343,325 B2    3/2008  Shaver et al.
8,245,157 B2*   8/2012  Kelly ................... G06F 3/0481
                                                         463/1
8,332,331 B2   12/2012  Thywissen
8,386,297 B2*   2/2013  Heyns ................... G06Q 10/06
                                                         705/7.35
8,548,932 B2   10/2013  Fellenstein et al.
(Continued)

FOREIGN PATENT DOCUMENTS

KR   10-20150015280   9/2015

OTHER PUBLICATIONS

Akkiraju, et al., "On Pricing Complex IT Service Solutions", SRII Global Conference, Apr. 2014, pp. 1-10.
(Continued)

*Primary Examiner* — Matthew S Gart
*Assistant Examiner* — Stephen S Swartz
(74) *Attorney, Agent, or Firm* — Tutunjian & Bitetto, P.C.; Vazken Alexanian (57) ABSTRACT

A hardware computer-implemented method is provided for pricing a current contract for bid that includes generating a tree of the current contract, and generating trees of historical contracts. The contracts each specify respective services. The method includes grouping the trees of historical contracts to form a plurality of groups of trees, based on respective tree distances between the trees in each group. The method includes identifying a group of trees, from the plurality of groups, that is closest to the tree of the current contract by calculating respective distances there between. The method includes calculating a price for the current contract based on gross profits and costs for each service in the identified group. The grouping, identifying, and calculating steps each use different methods, responsive to a service (a) having a baseline; and (b) lacking the baseline, wherein the baseline is a value that indicates a scale of the service.

20 Claims, 10 Drawing Sheets

(56) References Cited

U.S. PATENT DOCUMENTS

| | | | | |
|---|---|---|---|---|
| 8,732,015 B1* | 5/2014 | Beckerman | ........ | G06Q 30/0242 705/14.46 |
| 2003/0182177 A1* | 9/2003 | Gallagher | .......... | G06Q 10/0631 705/7.12 |
| 2003/0220773 A1* | 11/2003 | Haas | .................. | G06Q 10/0637 703/2 |
| 2009/0204551 A1* | 8/2009 | Wang | ................ | G06F 17/30463 705/400 |
| 2009/0234710 A1* | 9/2009 | Belgaied Hassine | .. | G06Q 30/02 705/7.29 |
| 2010/0030752 A1* | 2/2010 | Goldentouch | .... | G06F 17/30911 707/797 |
| 2013/0246307 A1 | 9/2013 | Sundaram et al. | | |
| 2014/0025431 A1* | 1/2014 | Bansal | .................. | G06Q 20/10 705/7.33 |

OTHER PUBLICATIONS

Lo, Reginald, "Service-based IT Cost Modeling and Identifying Cost Saving Opportunities", Third Sky, Inc., Jan. 2012, pp. 1-5, www.thirdsky.com.

* cited by examiner

| Level of detail of services | ID | Service name (label) | U | T1 | T2 |
|---|---|---|---|---|---|
| L1 | 1 | Intel Server | * | * | * |
| L2 | 1.1 | Operation service | * | * | |
| L2 | 1.2 | Management service | * | * | * |
| L3 | 1.1.1 | Operation subservice1 | 100 | 100 | |
| L3 | 1.2.1 | Management subservice1 | 100 | 100 | 100 |
| L3 | 1.2.2 | Management subservice2 | 100 | 100 | 100 |
| L3 | 1.2.3 | Management subservice3 | 100 | | 100 |

DETERMINING PRICING USING CATEGORIZED COSTS WITH TREE STRUCTURES

BACKGROUND

Technical Field

The present invention relates generally to determining pricing and, in particular, to determining pricing using categorized costs with tree structures.

Description of the Related Art

Information Technology (IT) service providers compete to win high valued IT service contracts. Typically, clients ask for proposals that specify the pricing of a service contract that includes multiple services and enter a deal bidding process. It is important for the IT service providers to expeditiously estimate the price of an IT service contract and also to produce a competitive price (bid) for the contract.

There would be two typical approaches used by a solution manager to estimate price. In a first approach, directed to minimizing the time spent for providing a service, the solution manager estimates the price by selecting a unit cost for each service based on past deals with which they were involved. In a second pattern, the solution manager estimates the price by breaking down the contract into several services, investigating the customer's requirements and service costs, and summing up the costs for the contract. However, the first approach sometimes does not reflect the market trend or does not take the deal volume into consideration. The second approach can take too much time to estimate the price and therefore result in a loss of the deal. In either case, both approaches can hinder the winning of new contracts.

SUMMARY

According to an aspect of the present principles, a hardware computer-implemented method is provided for pricing a current contract for bid. The method includes generating a tree of the current contract. The method further includes generating trees of historical contracts according to a level of detail of the tree of the current contract. The current contract and the historical contracts each specify a respective plurality of services. The method also includes grouping the trees of historical contracts to form a plurality of groups of trees, based on respective tree distances between the trees in each the plurality of groups of trees. The method additionally includes identifying a group of trees, from the plurality of groups of trees, that is closest to the tree of the current contract by calculating respective distances there between. The method further includes calculating a price for the current contract based on gross profits and costs for each of the plurality of services in the identified group of trees. The grouping, identifying, and calculating steps each use respective different methods to group, identify, and calculate, responsive to a service (a) having a baseline; and (b) lacking the baseline, wherein the baseline is a value that indicates a scale of the service.

According to another aspect of the present principles, a computer program product is provided for pricing a current contract for bid. The computer program product includes a computer readable storage medium having program instructions embodied therewith. The program instructions are executable by a hardware computer to cause the hardware computer to perform a hardware computer-implemented method. The method includes generating a tree of the current contract. The method further includes generating trees of historical contracts according to a level of detail of the tree of the current contract. The current contract and the historical contracts each specify a respective plurality of services. The method also includes grouping the trees of historical contracts to form a plurality of groups of trees, based on respective tree distances between the trees in each the plurality of groups of trees. The method additionally includes identifying a group of trees, from the plurality of groups of trees, that is closest to the tree of the current contract by calculating respective distances there between. The method further includes calculating a price for the current contract based on gross profits and costs for each of the plurality of services in the identified group of trees. The grouping, identifying, and calculating steps each use respective different methods to group, identify, and calculate, responsive to a service (a) having a baseline; and (b) lacking the baseline, wherein the baseline is a value that indicates a scale of the service.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to determining pricing using categorized costs with tree structures.

In an embodiment, the present principles can be advantageously provide a pricing method for contracts that include multiple Information Technology (IT) services. Of course, the present principles can also be readily applied to other types of services, while maintaining the spirit of the present principles.

Moreover, while the present principles are described herein with respect to the term "contract", the present principles can be applied to any similar item such as agreements, deals, bond, pact, treaty, and so forth. Accordingly, the term "contract" as used herein it intended to encompass at least the preceding mentioned items as well as similar items. These and other items to which the present principles can be applied are readily determined by one of ordinary skill in the art given the teachings of the present principles provided herein, while maintaining the spirit of the present principles.

Advantageously, the present principles shorten the amount of time spent by a solution manager from the point of obtain a customer's requirements to estimating price for a service contract that includes multiple services.

Moreover, the present principles advantageously increase the probability of winning a contract obtained by bidding, by providing pricing that is calculated from historical deals that fit a customers' requirements in a service contract that includes multiple services.

Figure 1:
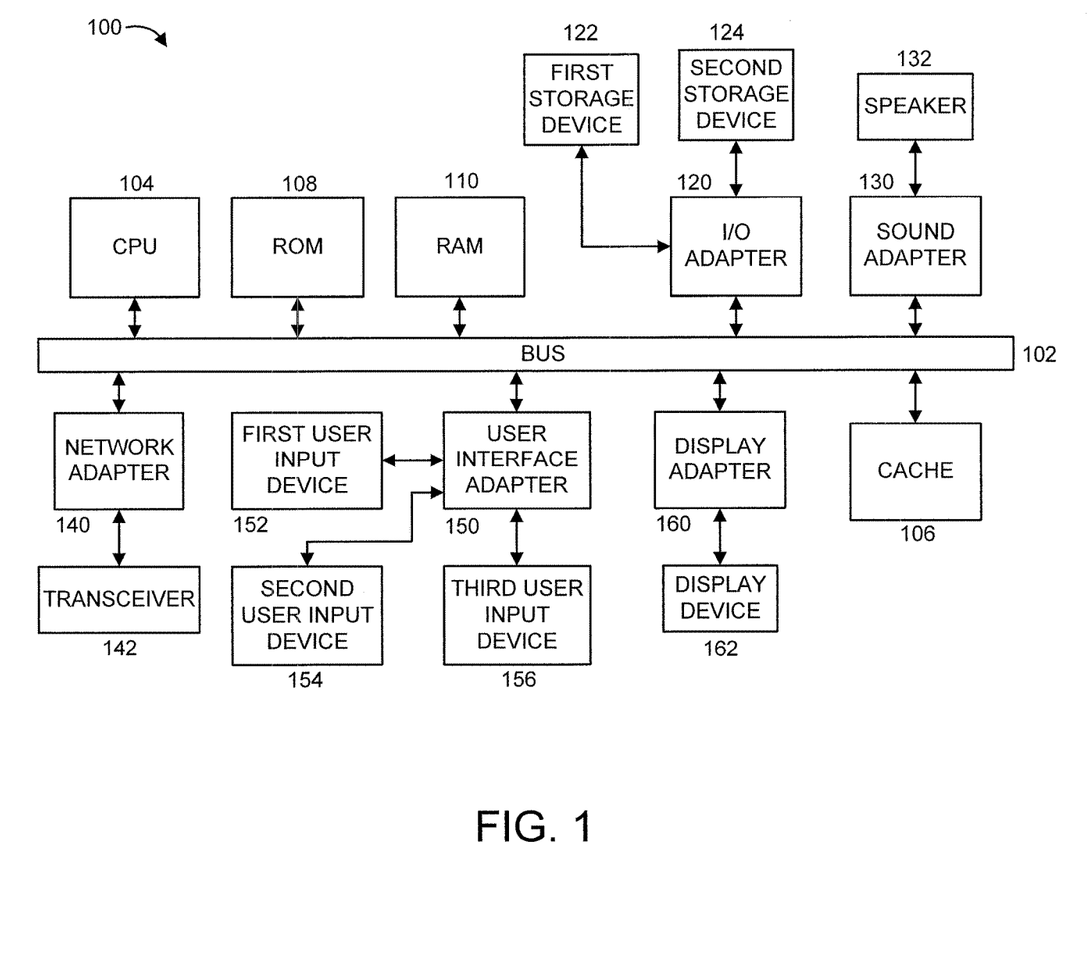
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
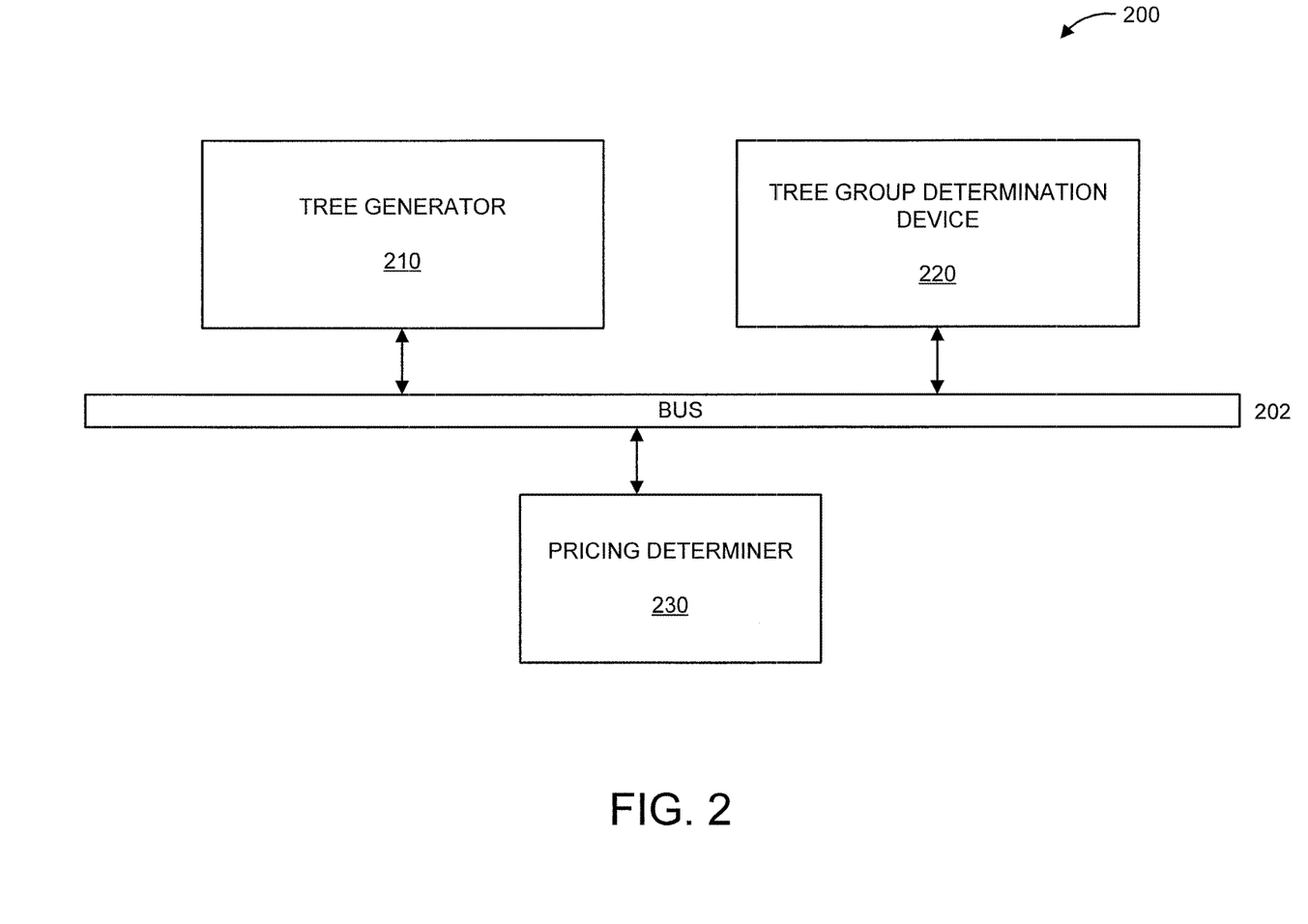
FIG. 2 shows an exemplary system 200 for learning intended user actions utilizing speech and gesture recognition, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
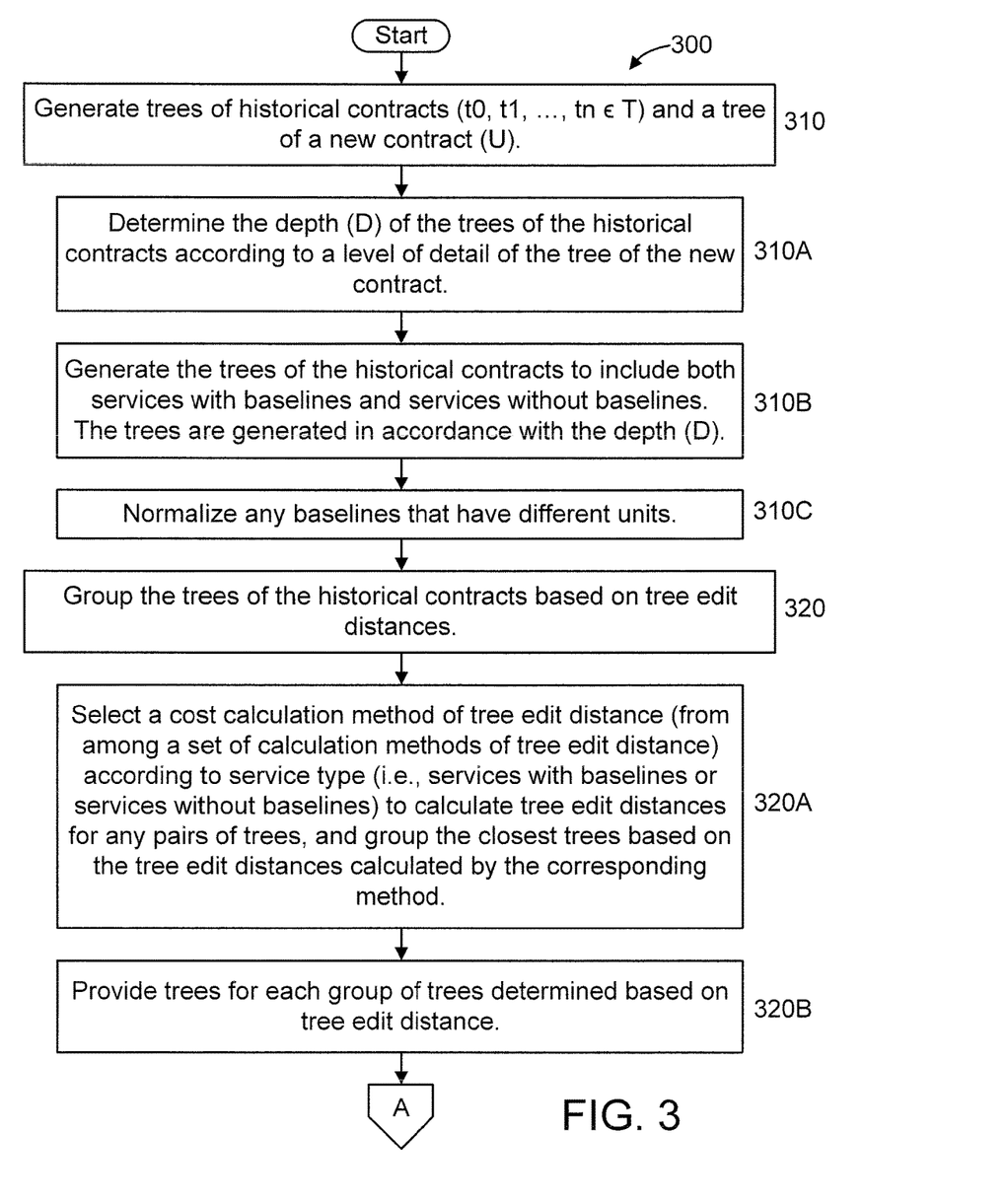
FIGS. 3-5 shows an exemplary method 300 for learning intended user actions utilizing speech and gesture recognition, in accordance with an embodiment of the present principles.
Figure 4:
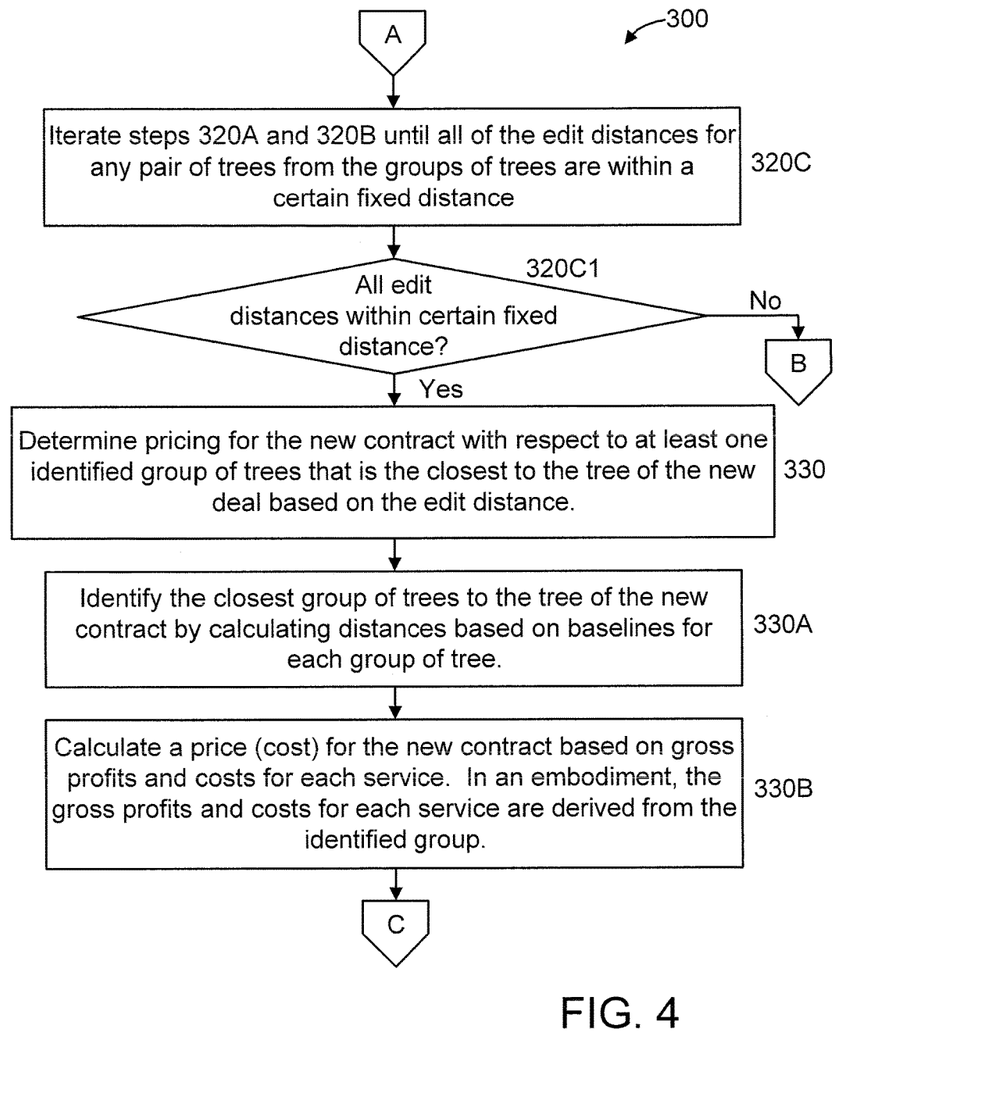
Figure 5:
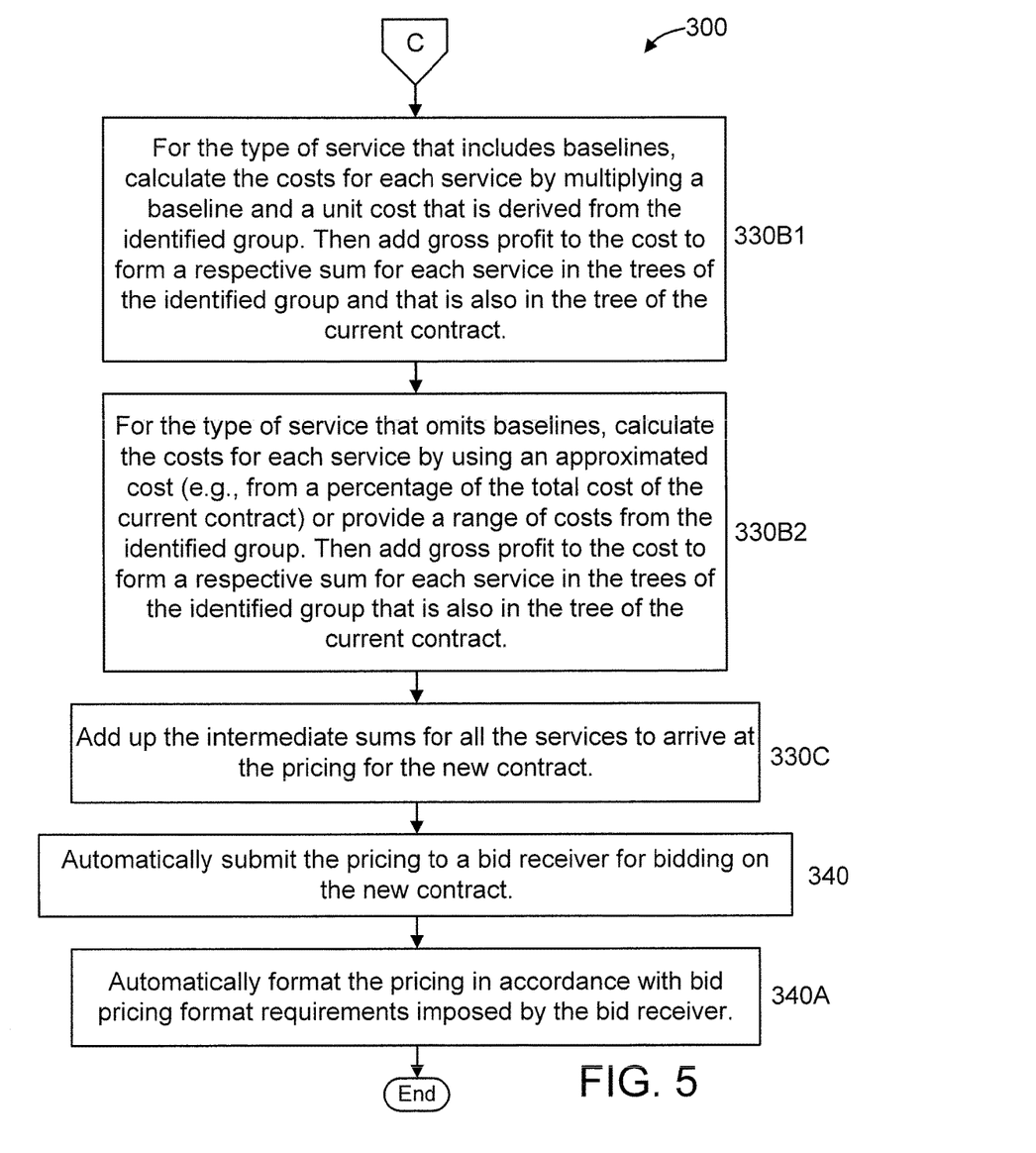

Further, it is to be appreciated that processing system 100 may perform at least part of the method described herein including, for example, at least part of method 300 of FIGS. 3-5. Similarly, part or all of system 200 may be used to perform at least part of method 300 of FIGS. 3-5.

FIG. 2 shows an exemplary system 200 for determining pricing using categorized costs with tree structures, in accordance with an embodiment of the present principles.

The system 200 includes a tree generator 210, a tree group determination device 220, and a pricing determiner 230.

The tree generator 210 generates tree structures (hereinafter "trees") as further described herein with respect to at least step 310 of method 300 of FIGS. 3-5. The tree group determination device 220 groups trees as further described herein with respect to at least step 320 of FIGS. 3-5. The pricing determiner 330 determining pricing information as further described herein with respect to at least step 330 of FIGS. 3-5.

In an embodiment, the elements of system 200 communicate pricing information over one or more networks to a bid receiver implemented by one or more computer servers.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles.

In an embodiment, a method of pricing generates trees of historical contracts with cost information that is based on a tree of a new contract, categorizes the trees of historical contracts while changing calculation methods of distances between the generated trees based on service types, and selects a group, out of a set of groups of categorized trees, that is the closest to the tree of the new contract.

FIG. 3 shows an exemplary method 300 for determining pricing using categorized costs with tree structures, in accordance with an embodiment of the present principles.

At step 310, generate trees of historical contracts (t0, t1, . . . , tn∈T) and a tree of a new contract (U).

The trees of the historical contracts (t0, t1, . . . , tn∈T) and the tree of the new contract (U) can have a root node, branch nodes, and leaf nodes. In an embodiment, at least some of the nodes (e.g., branch nodes and/or leaf nodes) represent the services (s0, s1, ..., sn∈S) and/or service related attributes specified in the respective contracts. In an embodiment, the root node represents a particular historical contract (e.g., by contract number, by primary involved hardware (Intel Server, etc.), etc.). In an embodiment, each non-root node (e.g., branch nodes and/or leaf nodes) has attributes that represent baselines, unit costs, gross profit, and other information related to costs associated with a particular service of a particular contract. In an embodiment, if a given service does not have a baseline, then a corresponding node(s) represents the given service without the baseline attribute. As used herein, a baseline is a value that indicates a scale of a service.

In an embodiment, step 310 can includes steps 310A-C.

At step 310A, determine the depth (D) of the trees of the historical contracts according to a level of detail of the tree of the new contract. The detail of the tree of the new contract can be formed from user inputs for baselines of the new contract or can be automatically extracted from the new contract. Methods for extracting such details can involve data mining and/or any other approach, as readily appreciated by one of ordinary skill in the art.

At step 310B, generate the trees of the historical contracts to include both services with baselines and services without baselines. The trees are generated in accordance with the depth (D).

At step 310C, normalize any baselines that have different units.

In an embodiment, step 310C involves executing the following iteration for depth d ($0 < d \leq D$):

Let S represent a set of services (s0, s1, ..., sm∈S) for depth d. Let T represent a set of all historical contracts (t0, t1, ..., tn∈T). Execute the following steps for each service s (s0, s1, ..., sm∈S):

Calculate maximum values and minimum values of the baselines of the service s for all historical deals T Execute the following step for each tree t (t0, t1, ..., tn∈T):

Normalize a baseline of the service s of tree t in a range from 0 to 1

Normalize a baseline of the service s of the new contract (U).

At step 320, group the trees of the historical contracts based on tree edit distances.

In an embodiment, step 320 can includes steps 320A-C.

At step 320A, select a cost calculation method of tree edit distance (from among a set of calculation methods of tree edit distance) according to service type (i.e., services with baselines or services without baselines) to calculate tree edit distances for any pairs (e.g., arbitrary combinations) of trees, and group the closest trees based on the tree edit distances calculated by the corresponding method.

In an embodiment, for a service with a baseline, an exemplary cost function for calculating edit distance can be defined using Euclidean distance as follows:

cost for s1 between t1 and t2=|(t1's baseline of s1)−(t2's baseline of s1)|

In an embodiment, for a service without a baseline, an exemplary cost function for calculating edit distance can be defined as follows:

if ((t1's s2 exists and t2's s2 exists) or (t1's s2 does not exists and t2's s2 does not exists))
cost for s2 between t1 and t2=0
else
cost for s2 between t1 and t2=1.

As is evident, the preceding costs are implemented in a binary manner, using a 0 or a 1 for cost values.

At step 320B, provide trees for each group of trees determined based on tree edit distance.

At step 320C, iterate steps 320A and 320B until all of the edit distances for any pair of trees from the groups of trees are within a certain fixed distance (that is, a threshold distance). This certain fixed distance can be based on, e.g., 30% (or some other percentage) of the initial distances at the step 320A of the first iteration (noting that it is presumed that all distances are ranged from 0 to 1). In an embodiment, step 320C involves steps 320C1.

At step 320C1, determine if all edit distances for any pair of trees from the groups of trees are within the certain fixed distance. If so, then the method proceeds to step 330. Otherwise, the method returns to step 320A.

At step 330, determine pricing for the new contract with respect to at least one identified group of trees that is the closest to the tree of the new deal based on the edit distance.

In an embodiment, step 330 can include steps 330A-C.

At step 330A, identify the closest group of trees to the tree of the new contract by calculating distances based on baselines for each group of tree.

At step 330B, calculate a price (cost) for the new contract based on gross profits and costs for each service. In an embodiment, the gross profits and costs for each service are derived from the identified group.

In an embodiment, step 330B can includes steps 330B1-B2.

At step 330B1, for the type of service that includes baselines, calculate the costs for each service by multiplying a baseline and a unit cost that is derived from the identified group. Then add gross profit to the cost to form a respective sum for each service in the trees of the identified group and that is also in the tree of the current contract. The respective sums for each service form a respective intermediate sum with respect to the pricing of the new contract.

At step 330B2, for the type of service that omits baselines, calculate the costs for each service by using an approximated cost (e.g., from a percentage of the total cost of the current contract) or provide a range of costs from the identified group. Then add gross profit to the cost to form a respective sum for each service in the trees of the identified group that is also in the tree of the current contract. The respective sums for each service form a respective intermediate sum with respect to the pricing of the new contract.

At step 330C, add up the intermediate sums for all the services to arrive at the pricing for the new contract.

At step 340, automatically submit the pricing to a bid receiver for bidding on the new contract. In an embodiment, the bid receiver can be a server set up to receive bids for the new contract. In an embodiment, the pricing is automatically submitted over one or more networks. In an embodiment, step 340 includes step 340A.

At step 340A, automatically format the pricing in accordance with bid pricing format requirements imposed by the bid receiver. Such formatting can include, but is not limited to: providing pricing information related to the pricing (e.g., underlying pricing information used to determine the pricing); the addition of fields of information, with the pricing information provided in the specified fields; converting the pricing into another application type; and so forth.

Figure 6:
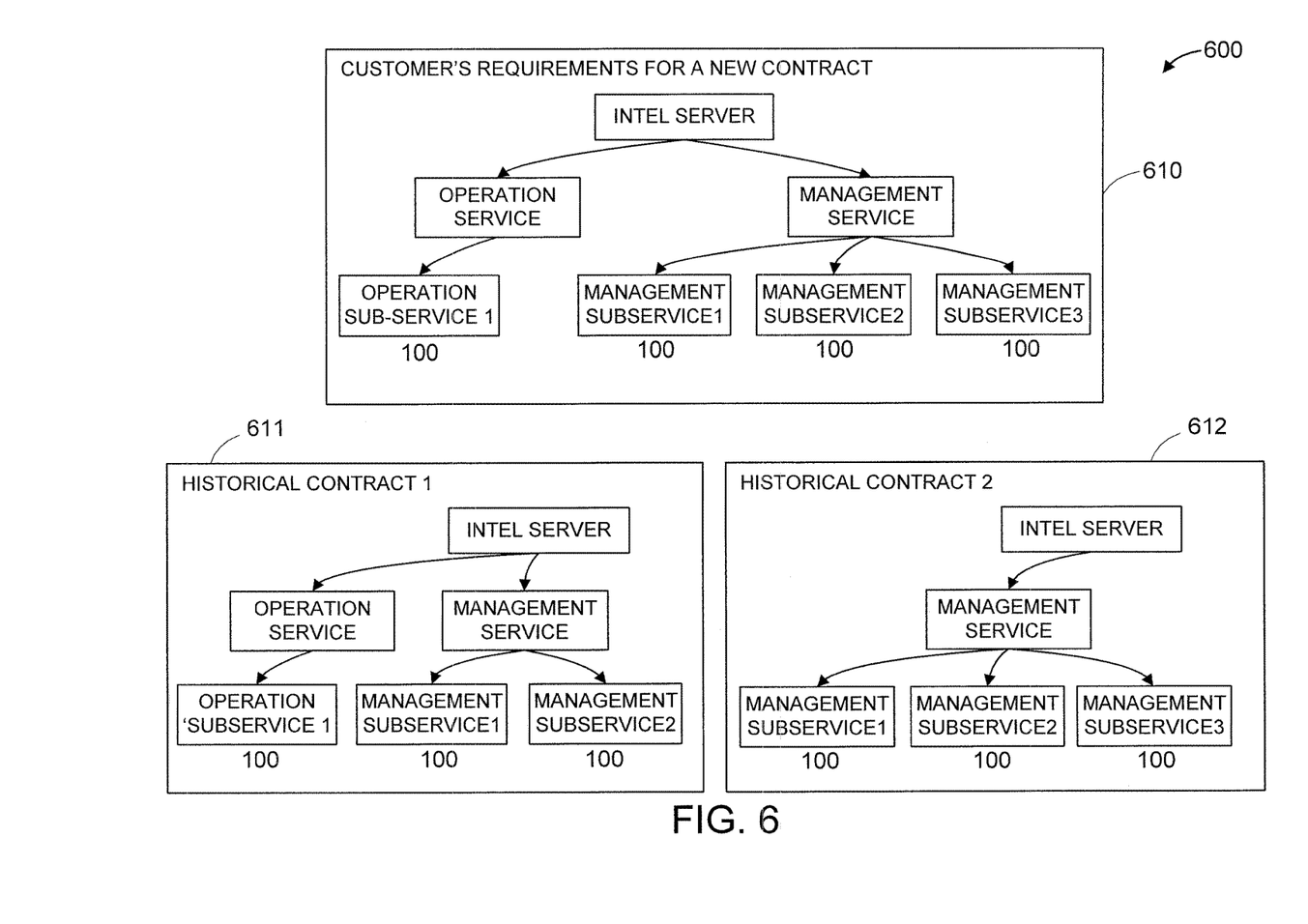
FIG. 6 shows exemplary contract requirements 600 to which the present principles can be applied, in accordance with an embodiment of the present principles.
Figure 7:
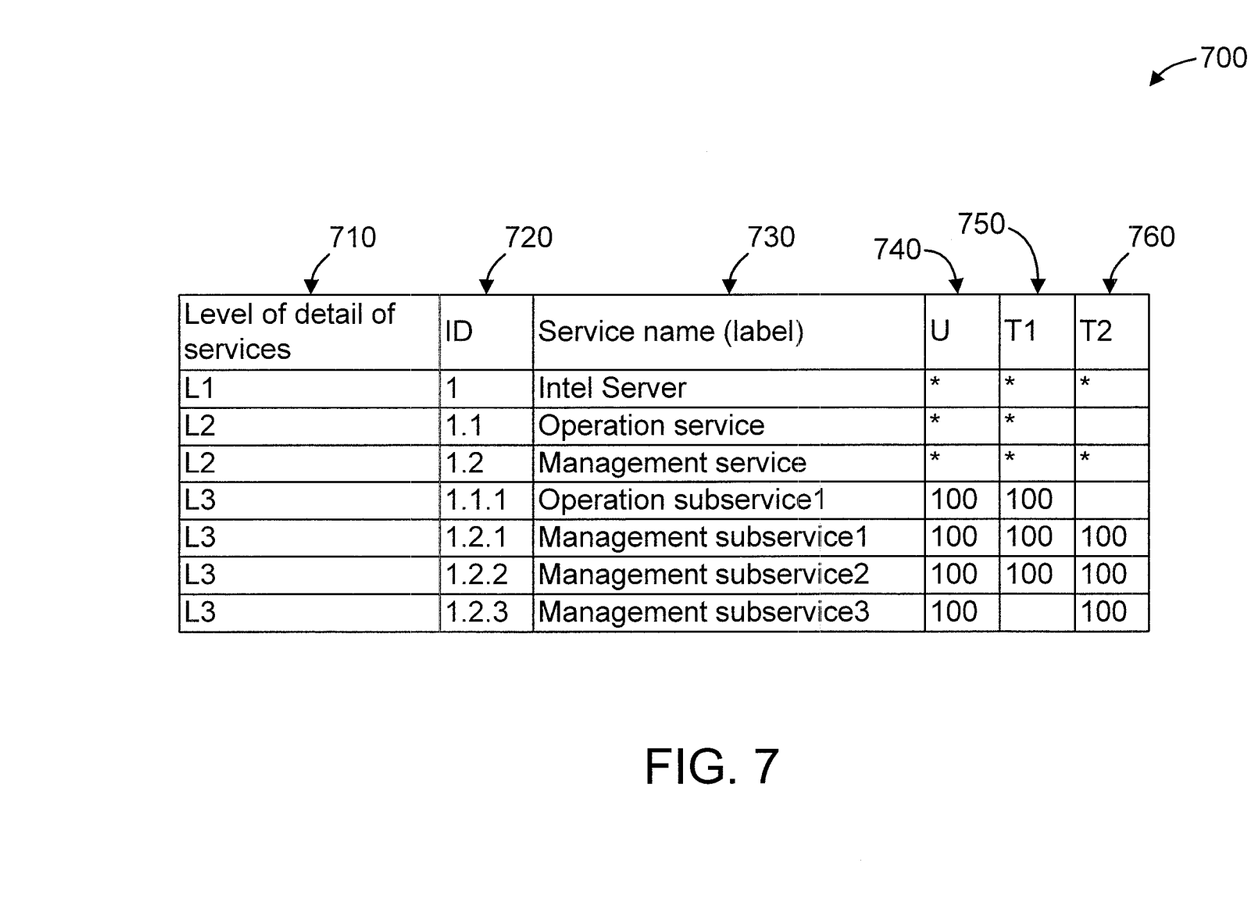
FIG. 7 shows a table 700 indicating service related information for the contract requirements shown in the example of FIG. 6, in accordance with an embodiment of the present principles.

FIG. 6 shows exemplary contract requirements 600 to which the present principles can be applied, in accordance with an embodiment of the present principles. FIG. 7 shows a table 700 indicating service related information for the contract requirements shown in the example of FIG. 6, in accordance with an embodiment of the present principles.

In FIG. 6, block 610 represents the customer's requirements in a new contract represented as a tree (U), block 611 represents the customer's requirements in a historical contract 1 represented as a tree (T1), and block 612 represents the customer's requirements in a historical contract 2 represented as a tree (T2). We note that contract 1 includes an Operation service and a Management service, but there is not management subservice 3, while contract 2 lacks the Operation service.

In FIG. 7, the table 700 includes, for the trees (U), (T1), and (T2), the level of detail 710 of the services in the trees, the ID 720 of the services in the trees, the names (labels) 730 of the services in the trees, and the baselines of the services if applicable.

Moreover, the following notations apply:
(*) distance: sum(abs(service1.baseline)−(service2.baseline))
(**) similarity=exp(−d)

In the example of FIGS. 6 and 7, the present principles evaluate the baselines of the services based on tree depth, and selects T1 since the similarity (**) of T1 against U is 0.5, while the similarity of T2 against U is 0.2, Thus, the present principles decide that T1 is closer to (U).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
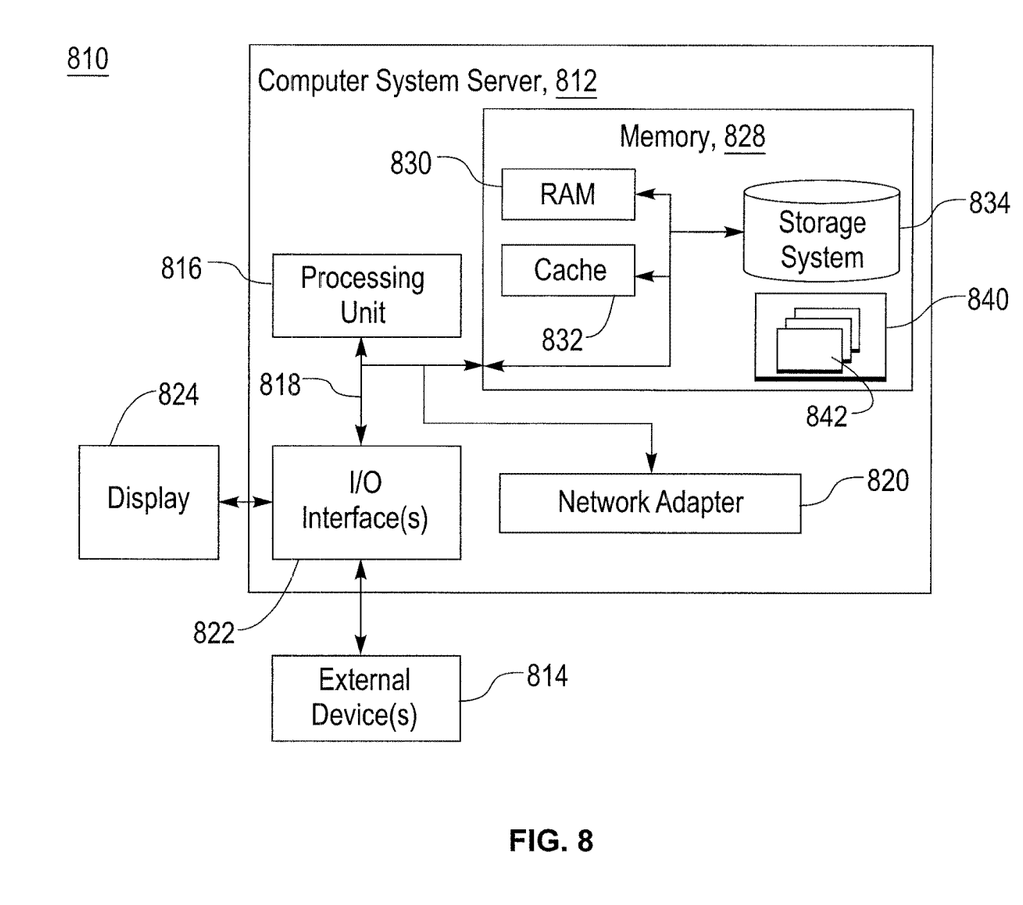
FIG. 8 shows an exemplary cloud computing node 810, in accordance with an embodiment of the present principles.

Referring now to FIG. 8, a schematic of an example of a cloud computing node 810 is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
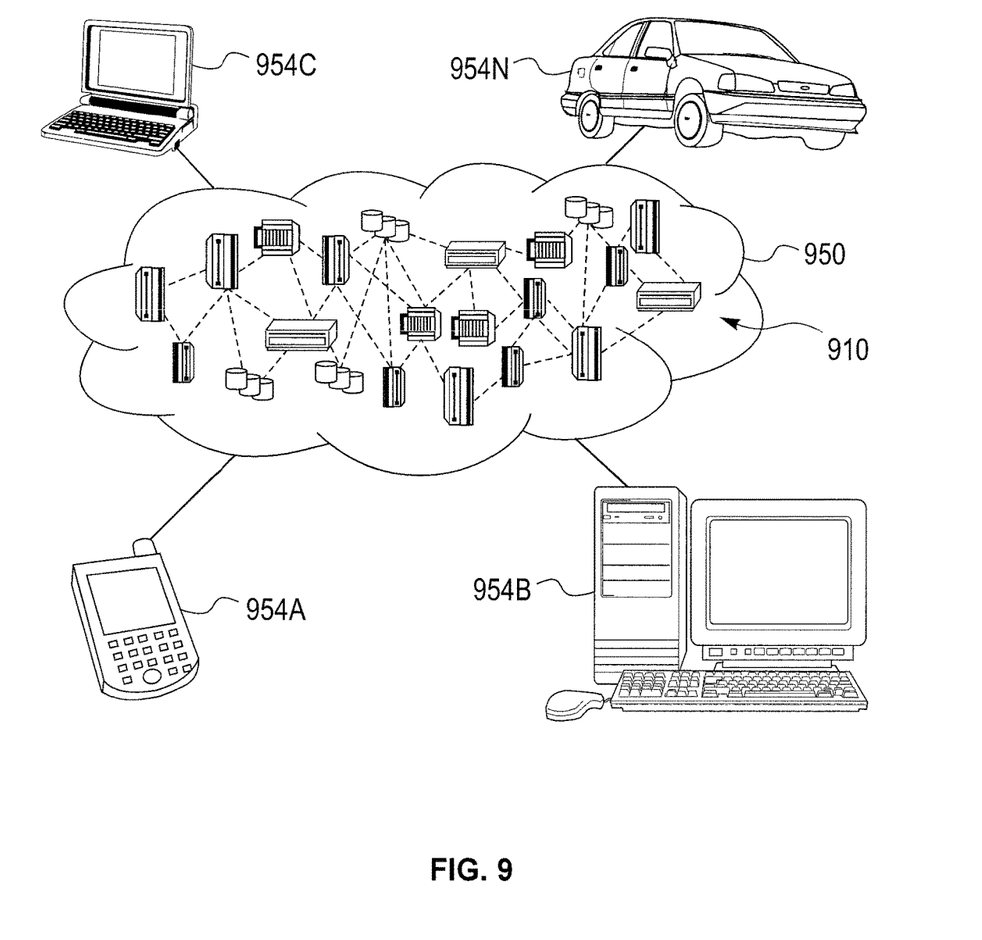
FIG. 9 shows an exemplary cloud computing environment 950, in accordance with an embodiment of the present principles.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
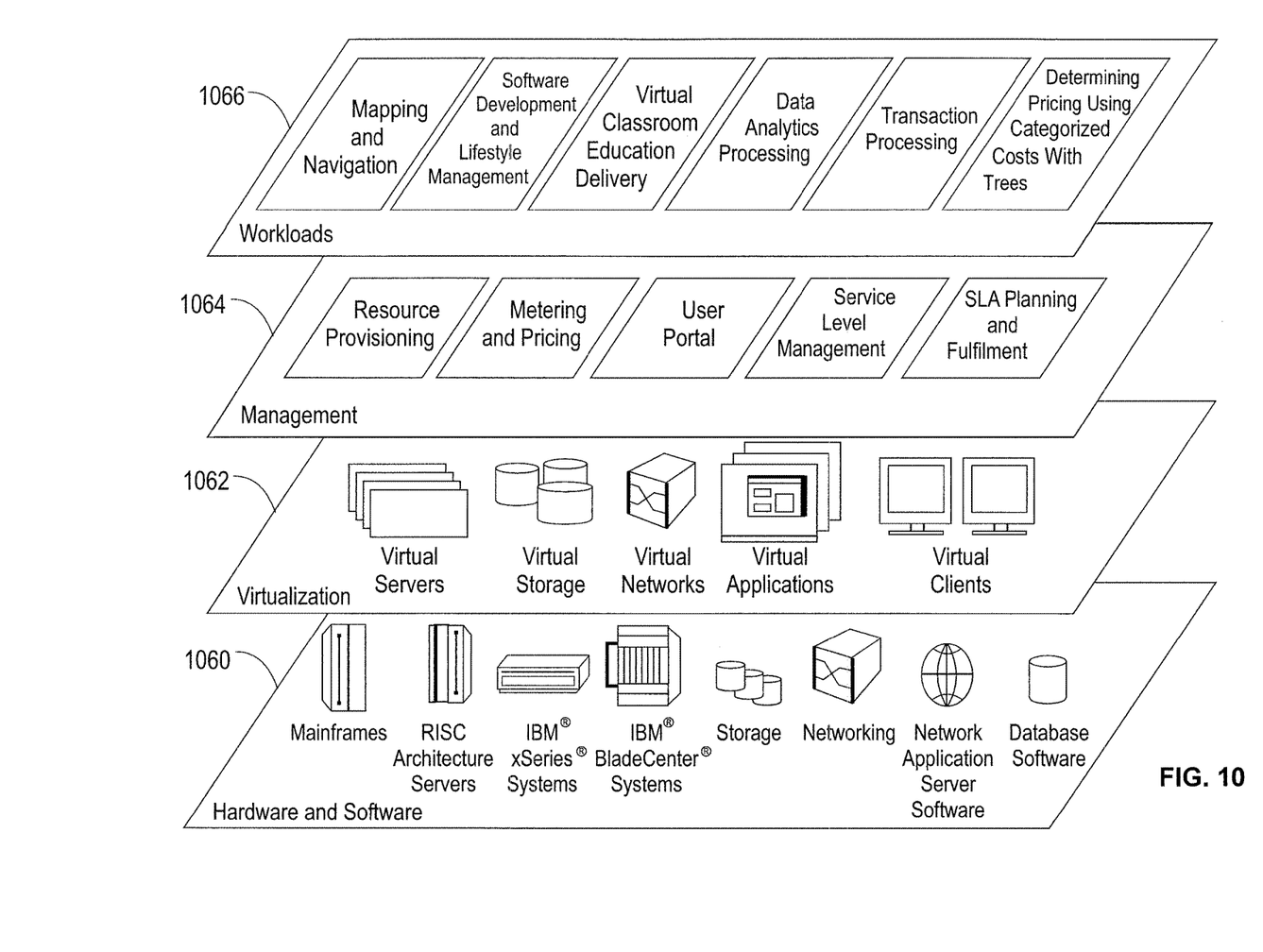
FIG. 10 shows exemplary abstraction model layers, in accordance with an embodiment of the present principles.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and determining pricing using categorized costs with tree structures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A hardware computer-implemented method for pricing a current contract for bid, the method comprising;
    generating, by a processor, a tree of the current contract;
    generating, by the processor, trees of historical contracts according to a level of detail of the tree of the current contract to shorten resource consumption time to be commensurate with the level of detail of the tree of the current contract, the current contract and the historical contracts each specifying a respective plurality of services;
    grouping, by the processor, the trees of historical contracts to form a plurality of groups of trees, based on respective tree distances between the trees in each the plurality of groups of trees;
    identifying, by the processor, a group of trees, from the plurality of groups of trees, that is closest to the tree of the current contract by calculating respective distances there between; and
    calculating, by the processor, a price for the current contract based on gross profits and costs for each of the plurality of services in the identified group of trees,
    wherein said grouping, identifying, and calculating steps each selectively use respective different methods to group, identify, and calculate, responsive to a service (a) having a baseline; and (b) lacking the baseline, wherein the baseline is a value that indicates a scale of the service.

2. The method of claim 1, wherein said calculating step comprises:
    calculating a cost for a given service from among the plurality of services in the identified group of trees, by multiplying the baseline and a unit cost for the given service that is derived from the identified group of trees;
    adding a gross profit for the given service to the cost for the given service to form an intermediate sum; and
    adding the intermediate sum for all of the plurality of services in the identified group.

3. The method of claim 1, wherein said step of generating trees of historical contracts comprises determining a depth of the trees of the historical contracts according to the level of detail of the tree of the current contract,
    wherein the trees of the historical contracts are generated in accordance with the determined depth.

4. The method of claim 1, wherein the trees of the historical contracts are generated to include services with the baselines and services without the baselines, and said generating step comprises normalizing any of the baselines that have different units.

5. The method of claim 4, wherein said normalizing step normalizes the baselines of the trees of the historical contracts by calculating a maximum baseline value and minimum baseline value for each of the services included in the trees of the historical contracts,
    wherein the maximum and minimum baseline values for the each of the services included in the trees of the historical contracts are normalized within a predetermined range of baseline values.

6. The method of claim 4, wherein said normalizing step normalizes the baseline of at least some of the respective plurality of services included in the tree of the new contract.

7. The method of claim 1, wherein nodes of the trees of the historical contracts comprise, at least one of, a set of baseline attributes, a set of unit cost attributes, and a set of gross profit attributes, wherein each of the sets comprises at least one respective member.

8. The method of claim 1, wherein said calculating step uses different methods to calculate the respective distances between (a) the tree of the current contract and the trees in the groups that include services with baselines, and (b) the tree of the current contract and the trees in the groups that lack services with baselines.

9. The method of claim 8, wherein the respective distances calculated between (a) the tree of the current contract and the trees in the groups that include services with baselines comprise Euclidean distances.

10. The method of claim 1, wherein the costs for each of the plurality of services in the identified group are provided as binary values.

11. A computer program product for pricing a current contract for bid, the computer program product comprising a non-transitory computer readable storage medium having program instructions embodied therewith, the program instructions executable by a hardware computer to cause the hardware computer to perform a hardware computer-implemented method comprising:
   generating, by a processor of the hardware computer, a tree of the current contract;
   generating, by the processor, trees of historical contracts according to a level of detail of the tree of the current contract to shorten resource consumption time to be commensurate with the level of detail of the tree of the current contract, the current contract and the historical contracts each specifying a respective plurality of services;
   grouping, by the processor, the trees of historical contracts to form a plurality of groups of trees, based on respective tree distances between the trees in each the plurality of groups of trees;
   identifying, by the processor, a group of trees, from the plurality of groups of trees, that is closest to the tree of the current contract by calculating respective distances there between; and
   calculating, by the processor, a price for the current contract based on gross profits and costs for each of the plurality of services in the identified group of trees,
   wherein said grouping, identifying, and calculating steps each use respective different methods to group, identify, and calculate, responsive to a service (a) having a baseline; and (b) lacking the baseline, wherein the baseline is a value that indicates a scale of the service.

12. The computer program product of claim 11, wherein said calculating step comprises:
   calculating a cost for a given service from among the plurality of services in the identified group of trees, by multiplying the baseline and a unit cost for the given service that is derived from the identified group of trees;
   adding a gross profit for the given service to the cost for the given service to form an intermediate sum; and
   adding the intermediate sum for all of the plurality of services in the identified group.

13. The computer program product of claim 11, wherein said step of generating trees of historical contracts comprises determining a depth of the trees of the historical contracts according to the level of detail of the tree of the current contract,
   wherein the trees of the historical contracts are generated in accordance with the determined depth.

14. The computer program product of claim 11, wherein the trees of the historical contracts are generated to include services with the baselines and services without the baselines, and said generating step comprises normalizing any of the baselines that have different units.

15. The computer program product of claim 14, wherein said normalizing step normalizes the baselines of the trees of the historical contracts by calculating a maximum baseline value and minimum baseline value for each of the services included in the trees of the historical contracts,
   wherein the maximum and minimum baseline values for the each of the services included in the trees of the historical contracts are normalized within a predetermined range of baseline values.

16. The computer program product of claim 14, wherein said normalizing step normalizes the baseline of at least some of the respective plurality of services included in the tree of the new contract.

17. The computer program product of claim 11, wherein nodes of the trees of the historical contracts comprise, at least one of, a set of baseline attributes, a set of unit cost attributes, and a set of gross profit attributes, wherein each of the sets comprises at least one respective member.

18. The computer program product of claim 11, wherein said calculating step uses different methods to calculate the respective distances between (a) the tree of the current contract and the trees in the groups that include services with baselines, and (b) the tree of the current contract and the trees in the groups that lack services with baselines.

19. The computer program product of claim 18, wherein the respective distances calculated between (a) the tree of the current contract and the trees in the groups that include services with baselines comprise Euclidean distances.

20. The computer program product of claim 11, wherein the costs for each of the plurality of services in the identified group are provided as binary values.

* * * * *